(12) United States Patent
Levi et al.

(10) Patent No.: US 11,392,663 B2
(45) Date of Patent: Jul. 19, 2022

(54) RESPONSE BASED ON BROWSER ENGINE

(71) Applicant: HEWLETT PACKARD DEVELOPMENT COMPANY, LP, Houston, TX (US)

(72) Inventors: Elad Levi, Yehud (IL); Avigad Mizrahi, Yehud (IL); Ran Bar Zik, Yehud (IL)

(73) Assignee: MICRO FOCUS LLC, Santa Clara, CA (US)

(*) Notice: Subject to any disclaimer, the term of this patent is extended or adjusted under 35 U.S.C. 154(b) by 918 days.

(21) Appl. No.: 15/306,183

(22) PCT Filed: May 27, 2014

(86) PCT No.: PCT/US2014/039513
§ 371 (c)(1),
(2) Date: Oct. 24, 2016

(87) PCT Pub. No.: WO2015/183235
PCT Pub. Date: Dec. 3, 2015

(65) Prior Publication Data
US 2017/0046449 A1    Feb. 16, 2017

(51) Int. Cl.
*G06F 16/957* (2019.01)
*G06F 16/951* (2019.01)
*G06F 16/958* (2019.01)
*G06F 8/41* (2018.01)
*G06F 9/455* (2018.01)

(52) U.S. Cl.
CPC ......... *G06F 16/9577* (2019.01); *G06F 8/443* (2013.01); *G06F 9/45516* (2013.01); *G06F 9/45529* (2013.01); *G06F 16/951* (2019.01); *G06F 16/986* (2019.01)

(58) Field of Classification Search
CPC .......... G06F 17/30905; G06F 16/9577; G06F 16/986; G06F 16/951; G06F 8/443; G06F 9/45516; G06F 9/45529
See application file for complete search history.

(56) References Cited

U.S. PATENT DOCUMENTS

| 6,167,441 A * | 12/2000 | Himmel | G06F 17/30905 707/999.104 |
| 6,336,137 B1 * | 1/2002 | Lee | G06F 9/54 707/E17.109 |
| 7,120,702 B2 * | 10/2006 | Huang | G06Q 40/04 709/246 |
| 7,610,356 B2 * | 10/2009 | Aarts | G06F 16/94 709/218 |

(Continued)

FOREIGN PATENT DOCUMENTS

| WO | WO-2002035798 A1 | 5/2002 |
| WO | WO-2010140008 A1 | 12/2010 |

OTHER PUBLICATIONS

Mahdavi et al., "Web Transcoding for Mobile Devices Using a Tag-Based Technique" 2010, World Applied Sciences Journal.*
Song et al., "A HTML to WML Translating Model Based on Information Extraction for Mobile Commerce" 2008, Dalian University of Technology.*

(Continued)

*Primary Examiner* — Debbie M Le
*Assistant Examiner* — Huen Wong

(57) ABSTRACT

In one implementation, a browser associated with a web request can be identified and code can be provided based on the browser.

20 Claims, 4 Drawing Sheets

(56) References Cited

U.S. PATENT DOCUMENTS

| | | | |
|---|---|---|---|
| 8,185,607 B1* | 5/2012 | Arzur | H04W 4/18 709/217 |
| 8,267,204 B2 | 9/2012 | Lyons | |
| 9,465,882 B2* | 10/2016 | Cabanier | G06T 13/80 |
| 2003/0182232 A1* | 9/2003 | Zeltzer | G06F 21/35 705/51 |
| 2005/0267798 A1 | 12/2005 | Panara | |
| 2006/0168095 A1* | 7/2006 | Sharma | H04M 3/493 709/217 |
| 2009/0024986 A1 | 1/2009 | Meijer et al. | |
| 2009/0292791 A1 | 11/2009 | Livshits et al. | |
| 2009/0313574 A1* | 12/2009 | Shih | G06F 3/0485 715/781 |
| 2010/0199197 A1* | 8/2010 | Faletski | G06F 16/9577 715/760 |
| 2011/0280256 A1* | 11/2011 | Salinger | H04Q 11/0067 370/419 |
| 2011/0289392 A1* | 11/2011 | Naqvi | G06F 17/3089 715/205 |
| 2012/0084133 A1* | 4/2012 | Ross | G06F 11/3438 705/14.27 |
| 2012/0194519 A1* | 8/2012 | Bissell | G06F 16/9577 345/428 |
| 2013/0174012 A1 | 7/2013 | Kwan et al. | |
| 2013/0227078 A1 | 8/2013 | Wei et al. | |
| 2014/0053143 A1 | 2/2014 | Conrod et al. | |
| 2014/0057596 A1* | 2/2014 | Brill | H04L 63/126 455/410 |
| 2014/0132978 A1* | 5/2014 | Igawa | G06F 3/1207 358/1.14 |
| 2014/0136944 A1* | 5/2014 | Harris | G06F 17/211 715/234 |
| 2014/0337405 A1* | 11/2014 | Athas | H04L 67/26 709/203 |
| 2014/0380278 A1* | 12/2014 | Dayan | G06F 11/3692 717/124 |
| 2016/0139914 A1* | 5/2016 | Levi | G06F 11/3604 717/121 |

OTHER PUBLICATIONS

Chang et al., "WebAccel: Accelerating Web access for low-bandwidth hosts" 2008, Georgia Institute of Technology.*

Kevin Sharp, "Five Keys to Converting WML Apps to XHTML", Nokia (Year: 2000).*

Laakko et al., "Adapting Web Content to Mobile User Agents", IEEE Computer Society (Year: 2005).* broofa.com, "JSLitmus," (Web Page), retrieved on Oct. 24, 2016, 3 pages, available at http://broofa.com/Tools/JSLitmus/.

Craven, P., "Auto-redirecting Methods and Examples," (Web Page), Nov. 3, 2003, 3 pages, available at http://www.webworkshop.net/auto-redirecting_methods.html.

Fortuna, E. et al., "A Limit Study of Javascript Parallelism," (Research Paper), Workload Characterization (IISWC), 2010 IEEE International Symposium on, IEEE, Jun. 15, 2010, 10 pages, available at http://homes.cs.washington.edu/~luisceze/publications/fortuna-iiswc2010.pdf.

International Search Report & Written Opinion received in PCT Application No. PCT/US2014/039513, dated Jan. 30, 2015, 14 pages.

jsperf.com, "jsPerf—JavaScript Performance Playground," (Web Page), retrieved on Oct. 24, 2016, 1 page, available at https://jsperf.com/.

Mozilla, "Firebug: JavaScript Debugger and Profiler," (Web Page), retrieved on Oct. 24, 2016, 5 pages, available at http://getfirebug.com/javascript.

Niyogi, S., "The New JavaScript Engine in Internet Explorer 9," (Web Page), Microsoft, Mar. 18, 2010, 16 pages, available at https://blogs.msdn.microsoft.com/ie/2010/03/18/the-new-javascript-engine-in-internet-explorer-9/.

Prieto, Y., "Semicolonvsnosemicolon," (Web Page), Jan. 4, 2014, 2 pages, available at https://jsperf.com/semicolonvsno.

Roland, J., "Fastest Array Loops in JavaScript," (Web Page), Jan. 19, 2012, 10 pages, available at https://jsperf.com/fastest-array-loops-in-javascript.

Wikipedia, "Control Flow," (Web Page), Apr. 28, 2014, 10 pages, available at https://en.wikipedia.org/w/index.php?title=Control_flow&oldid=606212916.

Wikipedia, "Software As A Service," (Web Page), May 20, 2014, 9 pages, available at https://en.wikipedia.org/w/index.php?title=Software_as_a_service&oidid=609357784.

* cited by examiner

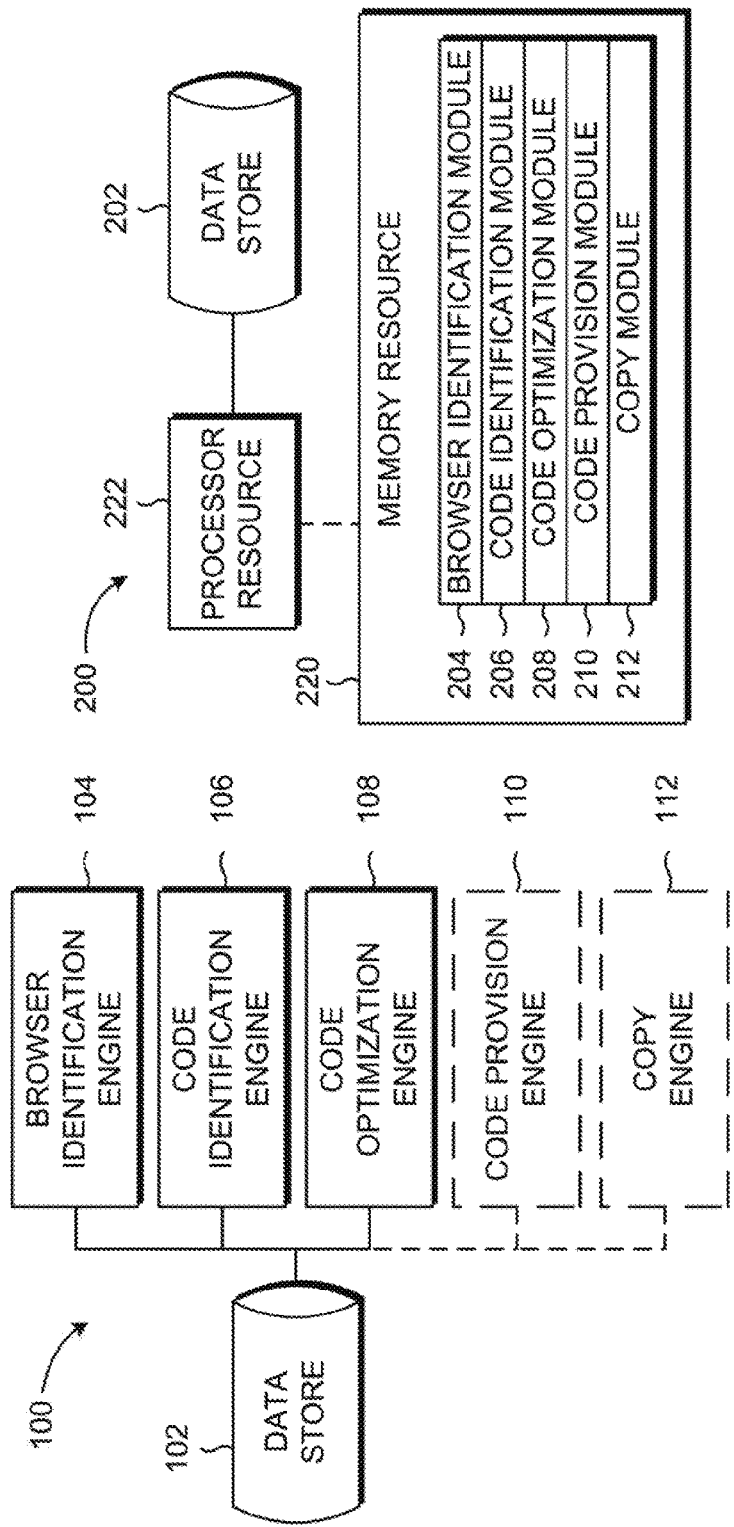

RESPONSE BASED ON BROWSER ENGINE

BACKGROUND

Web-based applications (including websites) can be complex and are commonly developed by multiple developers. Web-based applications can include instructions that execute on a backend server and instructions that execute on a client side browser. For example, a web request to a web based application or website can include scripts to be rendered on the device of a user for viewing and other interaction. Users of web-based applications commonly desire performance and consistency when consuming information provided by the web based applications.

BRIEF DESCRIPTION OF THE DRAWINGS

FIGS. 1 and 2 are block diagrams depicting example web request response systems.

DETAILED DESCRIPTION

Figure 3:
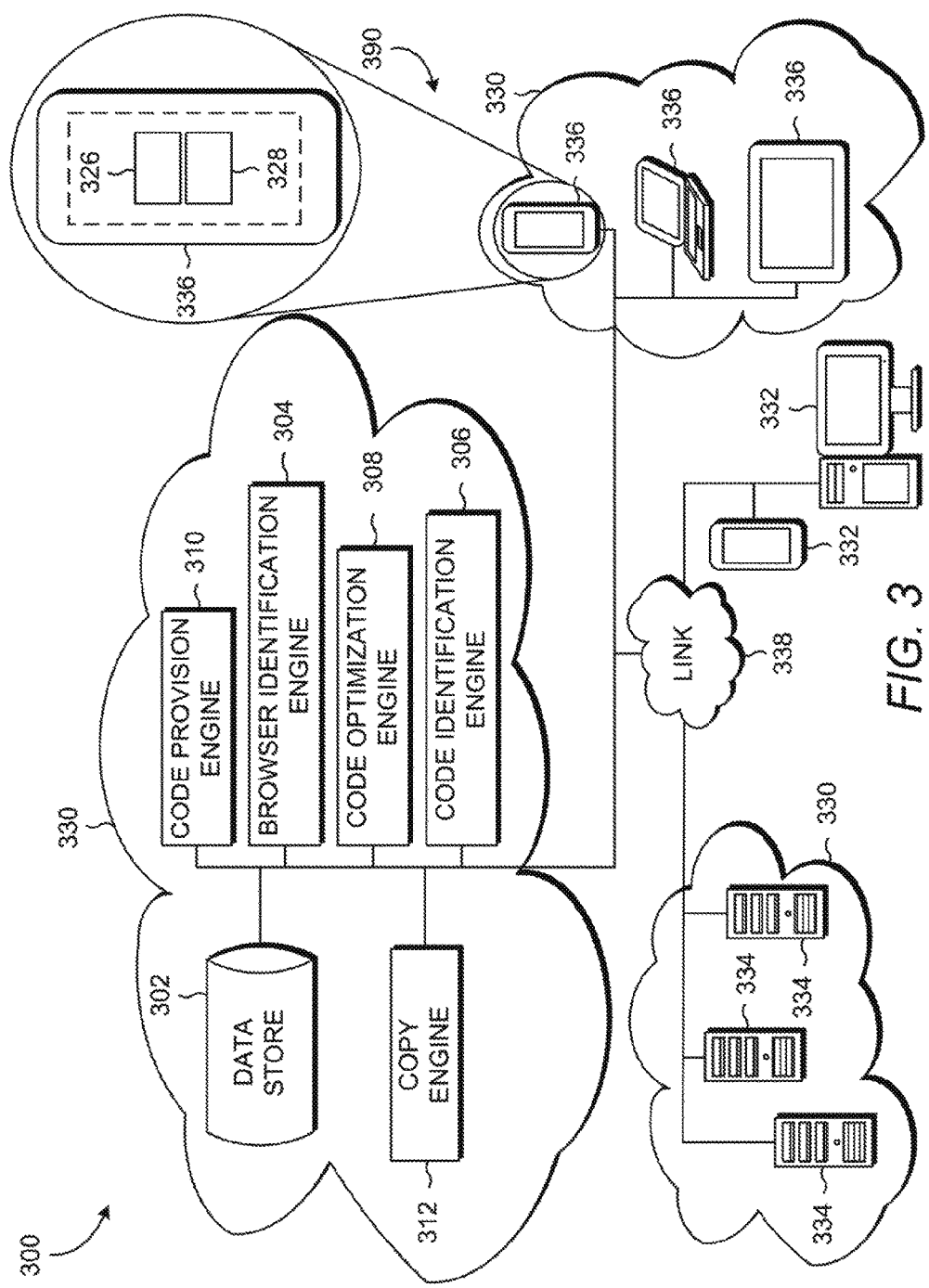
FIG. 3 depicts example environments in which various web request response systems can be implemented

In the following description and figures, some example implementations of web request systems and/or methods for responding to a web request are described. A web request is any appropriate request to a web application, such as a request for a page of a website available from a web server. A web application as discussed herein can include any appropriate instructions that are executable to produce a script that is renderable on a compute device of a user. For example, a web application can be mobile application that accesses instructions from a web server and executes the instructions via a browser application (also referred to herein as "browser"). For another example, the web application can be a page of a website having source code with a script. A script can be any appropriate instructions that can be rendered on a compute device. For example, the script can be a set of instructions written in the language of EMCASCRIPT (a. k. a, JAVASCRIPT) that is able to be rendered via a browser on a users compute device to produce presentable hypertext markup language ("HTML") code. A user can consume the rendered HTML code on any appropriate compute device, such as a mobile phone, a tablet, a laptop, a desktop, or any other compute device capable of executing a browser application. A browser application can include any instructions capable of rendering HTML code to cause a display to present a page of a website. The general steps to provide a web application to a user can include developing the code ("code" is also referred to herein as "instructions"), compiling the code, downloading the code, and rendering the code. Rendering code can include any translation interpretation, modification, or interaction of a first set of instructions to produce a second set of instructions understandable by a browser to cause an element of a page of a website to be presentable on a display.

There is a wide array of browsers available to view information via the Internet. Example browsers include the INTERNET EXPLORER browser available from the Microsoft Corporation, the CHROME browser available from Google Inc., the SAFARI browser available from Apple Inc., and the FIREFOX browser available from the Mozilla Foundation. Each of the above example browser types can provide different user experiences based on the rendering capabilities of the browser. Each browser can be made available for various versions and platforms. For example, each of the example browsers above may have a version branch developed for each operating system platform, such as a version for the WINDOWS operating system, the MAC operating system, and the ANDROID operating system. Browsers are commonly developed in a cycle and versions of the browsers can be released at the end of a cycle or to include updates, such as bug fixes. Depending on a user's frequency to update their browser, any number of versions of browsers can be used to access a page of a website. For example, it may become evident that some users are making web requests using version 8 of a browser though a version 11 of the browser has been released.

Browsers are commonly able to comprehend and present HTML code. Browsers commonly accept scripts to provide dynamic rendering of HTML code. For example, a page of a website may be personalized with the name or interests of an account holder of the website. In that example, various versions of the page may be rendered based on attributes of the environment of the web request. Examples of attributes of an environment of a web request include the time of day of the request request parameters (such as search parameters), or whether a user is registered with e website. The manner in which that code is rendered can vary based on the version of the browser, including the type of browser and the platform. For example, a browser may be updated with code to render a while loop in a different way from a previous version in order to expedite rendering of the while loop element in the newer version. The variation in rendering abilities of browsers can create a variation in time spent to render the same web application across different browsers. For example, the basic core programming elements of the JAVASCRIPT language are rendered differently in each browser and even among different versions of each browser.

Various examples described below relate to providing a response to a web request based on a browser. A code can be modified based on known attributes of a version of a web browser and the code can be tailored for a rendering on the particular browser. In this manner, a browser can receive instructions from a web application that are optimized to produce presentable HTML code at a speed that is faster than if the browser received the original, non-modified code.

The terms "include," "have," and variations hereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, and/or modify."

FIGS. 1 and 2 are block diagrams depicting example web request response systems 100 and 200. Referring to FIG. 1, the example web request response system 100 of FIG. 1 generally includes a data store 102, a browser identification engine 104, a code identification engine 106, and a code optimization engine 108. In general, the code optimization engine 108 can modify code identified by the code identification engine 106 based on the information identified by the browse identification engine 104. The web request response system 100 can also include a code provision engine 110 and a copy engine 112.

The browser identification engine 104 represents any combination of circuitry and executable instructions to identify a browser engine to receive a response of a web request. For example, browser identification engine 104 can identify the type and version of the browser engine (e.g. the engine of the browser to perform rendering of code) to receive a script in response to a request to access a web application. The browser engine designated to receive the response can be identified as the browser engine that made the request. For example, the browser identification engine 104 can identify the browser engine based on the web request (e.g. such as isolating the information in the headers of the packets of the web request associated with the browser). The browser engine can be identified via other methods as well, such as making a request for the version and/or other information to the browser engine. The browser identification engine 104 can identify a browser engine based on a value (such as a cardinal, ordinal, or a nominal number), a character, a string, a category, a version, a label, a data structure, or other reference.

The code identification engine 106 represents any combination of circuitry and executable instructions to identify a code that matches the condition of a predetermined rule. The code optimization engine 108 represents any combination of circuitry and executable instructions to maintain code based on the predetermined rule. For example, the code identification engine 106 can crawl a set of instructions to identify code that can be optimized based on the browser engine of the request and the code optimization engine 108 can make modifications on an instruction (or set of instructions) identified by the code identification engine 106.

A predetermined rule can include a condition (i.e. a state or set of circumstances to be satisfied) and a result (i.e. an action to perform when the condition is satisfied). A condition can include the existence of a character, a structure, a control element, a format, or a combination thereof. For example, the predetermined rule can include a condition of identifying a character (such as a semicolon) or a format of characters in the code (such as a string that matches a regular expression). For another example, the code identification engine 106 can identify format structure or control elements and mark them according to form, type, or other attribute associable with a predetermined rule. A result can include any maintenance action to the code. For example, a result could be an instruction to maintain (add or delete) a particular character (e.g. semicolons) or set of characters in a section of code (e.g. within a statement, a line of code, a set of brackets, a function, a data structure, or a module). Example maintenance actions (i.e. code modifications) can include a format modification, a data element modification, and a control element modification. Example format modifications resulting from a condition can include maintaining a character (or set of characters) of the code and altering the order of instructions. An example data element can include a change in data structure such as a change a predefined string data structure to an array of characters. An example control element can include a converting of a basic control element (e.g. loop element, condition element, block element, switch element, break element, or a go-to element) of a first type to a second type, such as change a recursive loop to an iterative loop. The code elements, in particular the control elements, are meant as non-limiting examples. The knowledge base of predetermined rules can include predetermined rules for identifying and replacing control structures that are more complex than basic control structures.

The maintenance actions of the knowledge base can be limited to actions that produce code renderable by a browser engine. For example, the code modifications of a script can be performed without changing the HTML code to be rendered from the original script (e.g. HTML code rendered by the original code is the same as HTML code rendered by the modified code).

The condition can include multiple factors and the result can include multiple modifications. For example, the condition can be a version 10 or greater of a browser and the code contains a semicolon at the end of a line of code, and the result can be to remove all semicolons at the end of a line of code and limit variable names to 30 characters.

The predetermined rule may be based on a browser engine. For example, the predetermined rule for a browser version associated with a mobile device can be to remove semicolons from a script of the web application. For another example, the predetermined rule can be to change a basic loop control element to a do-while loop element in version 10 of a browser and a for-each loop element in version 11 of the browser.

The code optimization engine 108 can modify a first code with the code modification of a predetermined rule to produce a second code. For example, the code optimization engine 108 can produce the second code by replacing the first code with a template of code that is more efficiently renderable. For another example, the condition of a predetermined rule can include a first format template (e.g. a regular expression) and the associated result of the predetermined rule can replace the first code matching the first format template with second code based on a second format template. The first code and the second code, when executed, can cause the browser engine to render HTML presentable by the browser. The predetermined rule can use a condition to identify the first code and produce the second code based on the attributes (e.g. a render capability) of the browser engine associated with the request. The second code can be optimized based on the knowledge base of predetermined rules associated with the browser engine. For example, all the predetermined rules of the knowledge base pertaining to the first code and the browser (i.e. the first code matches the condition of the predetermined rule) can adjust the first code with the results (i.e. make the code modifications associated with the predetermined rules of the matched conditions) to produce a second code that is particularly modified for the browser engine of the web request (i.e. the second code causes the browser to complete the HTML rendering faster than the first code). In that example, it would be expected that the second code (i.e. modified code) would be renderable by the browser engine faster than a rendition (i.e., a rendering) of the first code on the same browser engine.

The second code can be produced based on optimizations associated with a render capability of the browser engine. For example, browser types vary in development of the browser engine and that can directly or indirectly affect the how the browser engine renders HTML code from a script. The consequence of that example is that each browser engine is capable of rendering code in an individualized manner and at a speed that can vary from another browser engine. The render capability of a browser represents the method and/or manner of rendering by the browser engine, such as how a first code (e.g. a script) is interpreted by the browser engine and modified into a second code (e.g. HTML code) that can cause the browser engine to present a web element (or combination of web elements such as a page of a website).

The knowledge base can include a plurality of predetermined rules, conditions, and results associated with browser rendering. The knowledge base can include a list of browser identifiers. For example, each browser identifier can associate with a combination of a browser type, a browser version, and a browser platform. The predetermined rules can be associated with a browser identifier to identify the predetermined rules that affect render performance on a browser associated with the browser identifier (i.e. identify the code modifications associated with improving a rendering of a script on the browser).

The code provision engine 110 represents any combination of circuitry and executable instructions to provide code to execute on the browser engine. For example, the code provision engine 110 can provide the second code produced by the code optimization engine 108 to the browser in response to the web request from the browser. The code provision engine 110 can prepare the code for transmission. For example, the code can be placed in a payload of a packet and wrapped in a header with the destination set as the location of the browser engine.

The copy engine 112 represents any combination of circuitry and executable instructions to maintain a plurality of copies of the first code. Each copy of the plurality of copies of the first code can be associated with a separate browser version. For example, the plurality of copies can contain a copy for each published version of a browser. The plurality of copies can be maintained based on a plurality of browser identifiers. For example, the copy engine 112 can create a copy for each of the browsers identified in the knowledge base and each copy can be maintained with a ode modification associated with a predetermined rule based on a browser identifier associated with a browser engine.

The data store 102 can contain information utilized by the engines 104, 106, 108, 110, and 112. For example, the data store 102 can store the code of the web application and a knowledge base having a predetermined rule. The knowledge base can be maintained. For example, the knowledge base can be updated when a new version of a browser is released or when analysis performed on a browser provides new results. A predetermined rule can be storable in a predefined data structure. For example, a data structure of a predetermined rule can include a first string variable for a condition and a second string variable for a result. For another example, a data structure for use with the predetermined rules can include a browser identifier and a list of modification identifiers where each modification identifier is associated with a predetermined rule in the knowledge base.

FIG. 2 depicts the example web request response system 200 can be implemented on a memory resource 220 operatively coupled to a processor resource 222. The processor resource 222 can be operatively coupled to a data store 202. The data store 202 can be the same as the data store 102 of FIG. 1.

Referring to FIG. 2, the memory resource 220 can contain a set of instructions that are executable by the processor resource 222. The set of instructions can implement the system 200 when executed by the processor resource 222. The set of instructions stored on the memory resource 220 can be represented as a browser identification module 204, a code identification module 206, a code optimization module 208, a code provision module 210, and a copy module 212. The processor resource 222 can carry out a set of instructions to execute the modules 204, 206, 208, 210, 212, and/or any other appropriate operations among and/or associated with the modules of the system 200. For example, the processor resource 222 can carry out a set of instructions to maintain a plurality of codes based on a knowledge base and provide, responsive to a web request, a code of the plurality of codes based on a browser identifier associated with a browser. For another example, the processor resource 222 can carry out a set of instructions to store the application code, crawl the application code to identify script code associated with an entry in the knowledge base, maintain a list of browser identifiers based on information of a plurality of possible browser engines, sign each browser identifier of the list of browser identifiers to a code of the plurality of codes, and modify the plurality of codes based on a plurality of entries in the knowledge base associated with the browser identifier assigned to each plurality of code. The plurality of entries can include the information associated with a plurality of predetermined rules. For example, each entry of the plurality of entries can include a second format template (i.e. a result) to replace code of a first format template (i.e. a condition). The browser identification module 204, the code identification module 206, the code optimization module 208, the code provision module 210, and the copy module 212 represent program instructions that when executed function as the browser identification engine 104, the code identification engine 106, the code optimization engine 108, the code provision engine 110, and the copy engine 112 of FIG. 1, respectively.

The processor resource 222 can be one or multiple central processing units ("CPUs") capable of retrieving instructions from the memory resource 220 and executing those instructions. Such multiple CPUs can be integrated in a single device or distributed across devices. The processor resource 222 can process the instructions serially, concurrently, or in partial concurrence.

The memory resource 220 and the data store 202 represent a medium to store data utilized and/or produced by the system 200. The medium can be any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine readable, such as computer readable. The memory resource 220 can be said to store program instructions that when executed by the processor resource 222 implement the system 200 of FIG. 2. The memory resource 220 can be integrated in the same device as the processor resource 222 or it can be separate but accessible to that device and the processor resource 222. The memory resource 220 can be distributed across devices. The memory resource 220 and the data store 202 can represent the same physical medium or separate physical mediums. The data of the data store 202 can include representations of data and/or information mentioned herein.

In the discussion herein, the engines 104, 106, 108, 110, and 114 of FIG. 1 and the modules 204, 206, 208, 210, and 212 of FIG. 2 have been described as a combination of circuitry and executable instructions. Such components can be implemented in a number of fashions. Looking at FIG. 2, the executable instructions can be processor executable instructions, such as program instructions, stored on the memory resource 220, which is a tangible, non-transitory computer readable storage medium and the circuitry can be electronic circuitry, such as processor resource 222, for executing those instructions.

In one example, the executable instructions can be part of an installation package that when installed can be executed by the processor resource 222 to implement the system 200. In that example, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can include integrated memory such as a hard drive, a solid state drive, random access memory ("RAM"), read only memory ("ROM"), electrically erasable programmable ROM ("EEPROM"), flash memory, or the like.

FIG. 3 depicts example environments in which various example web request response systems 300 can be implemented. The example environment 390 is shown to include an example system 300 for responding to a web request. The system 300 (described herein with respect to FIGS. 1 and 2) can represent generally any combination of circuitry and executable instructions to respond to a web request based on a browser. The system 300 can include a browser identification engine 304, a code identification engine 306, a code optimization engine 308, a code provision engine 310 and a copy engine 312 that are the same as the browser identification engine 104, the code identification engine 106, the code optimization engine 108, the code provision engine 110, and the copy engine 112 of FIG. 1, respectively, and the associated descriptions are not repeated for brevity. As shown in FIG. 3, the engines 304, 306, 308, 310, and 312 can be integrated into a compute device, such as a service device 334. The engines 304, 306, 308, 310, and 312 can be integrated via circuitry or as installed instructions into a memory resource of the compute device.

The example environment 390 can include compute devices, such as developer devices 332, service devices 334, and user devices 336. A first code (i.e. a first set of instructions) can be developed on a developer device 332. For example, a script can be developed and/or modified on a developer device 332 and stored onto a web server, such as a service device 334. The service devices 332 represent generally any compute devices configured to respond to a network request received from a user device 336, whether virtual or real. For example, a service device 332 can provide a second code (i.e. a modified set of instructions based on the first set of instructions and a predetermined rule) in response to a request for a page of website containing the first code. The user devices 336 represent generally any compute devices configured with a browser to communicate a network request and receive and/or process the corresponding responses. For example, a user device 336 can receive second code based on first code on the service device 334, render the second code via a browser engine 326 on user device 336, and cause a web element to display on the user device 336 via a display engine 328 based on a rendition of the second code.

The compute devices can be located on separate networks 330 or part of the same network 330. The example environment 390 can include any appropriate number of networks 330 and any number of the networks 330 can include a cloud compute environment. For example, networks 330 can be distributed networks comprising virtual computing resources or "clouds." Any appropriate combination of the system 300 and compute devices can be a virtual instance of a resource of a virtual shared pool of resources. The engines and/or modules of the system 300 herein can reside and/or execute "on the cloud" (e.g. reside and/or execute on a virtual shared pool of resources.)

A link 338 generally represents one or a combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

Referring to FIGS. 1-3, the engines 104, 106, 108, 110, and 112 of FIG. 1 and/or the modules 204, 206, 208, 210, and 212 of FIG. 2 can be distributed across devices 332, 334, 336, or a combination thereof. The engine and/or modules can complete or assist completion of operations performed in describing another engine and/or module. For example, the code provision engine 310 of FIG. 3 can request, complete, or perform the methods or operations described with the code provision engine 110 of FIG. 1 as well as the browser identification engine 104, the code identification engine 106, the code optimization engine 108, and the copy engine 112 of FIG. 1. The engines of the system 300 can perform example methods described in connection with FIGS. 4-8.

Figure 4:
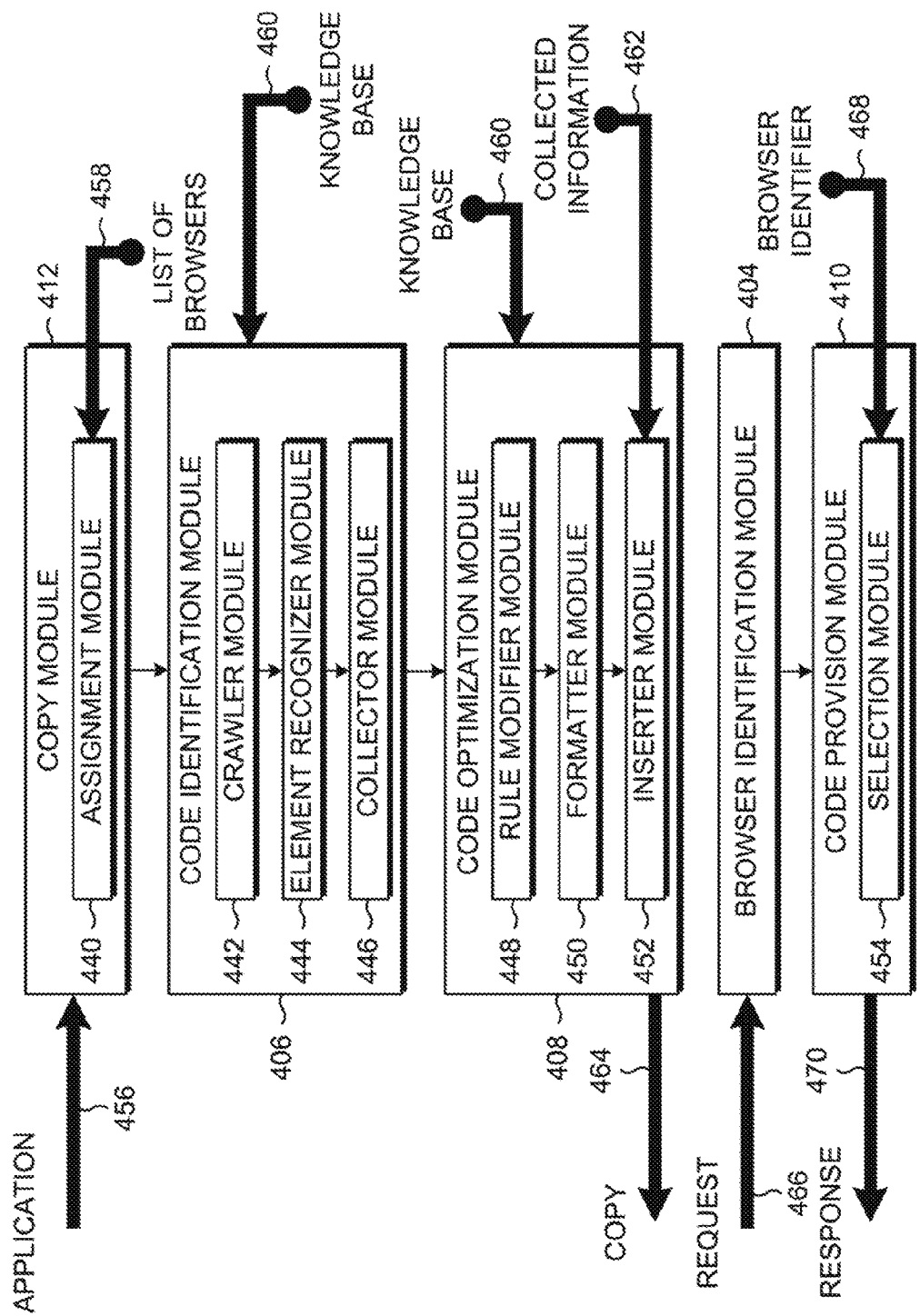
FIG. 4 depicts example modules used to implement example web request response systems.

FIG. 4 depicts example modules used to implement example web request response systems. Referring to FIG. 4, the example modules of FIG. 4 generally include a copy module 412, a code identification module 406, a code optimization module 408, a browser identification module 404, and a code provision module 410 that can be the same as the copy module 212, the code identification module 206, the code optimization module 208, the browser identification module 204, and the code provision module 210 of FIG. 2, respectively. The example modules of FIG. 4 are program instructions implemented on a compute device having a processor to execute the program instructions, such as a service device 334 of FIG. 3.

When an application 456 (such as a web application) is provided to a compute device having an example system for responding to a web request, the code of the application 456 can be copied by the copy module 412 to create a plurality of copies of code of the application 456. Each of the plurality of copies can be designated as a copy 464 for a particular browser identifier 468 (i.e. a combination of browser type, browser platform, and browser development version). For example, the copy module 412 can duplicate the code for each browser identifier 468 in a list of browsers 458 and an assignment module 440 of the copy module 412 can assign each of the plurality of copies to one of the items in the list of browsers 458. The list of browsers 458 can be an array, linked list, or any other appropriate data structure.

The code identification module 406 can include a crawler module 442, an element recognizer module 444, and a collector module 446. The crawler module 442 can crawl the code of the application 456 to identify a condition of an entry in the knowledge base 460. The element recognizer module 444 can identify the condition (e.g. identify a match between a first code of the application and a format template of the condition in the knowledge base). The element recognizer module 444 can flag or otherwise track the code for potential optimization. The collector module 446 can gather the information 462 utilized in the code optimization stage, such as variable information. For example, the collector module 446 would gather the variable name of array name when a while loop element was discovered that looped a function to perform on an array entitled array name.

The code optimization module 408 can include a rule modifier module 448, a formatter module 450, and an inserter module 452. The rule modifier module 448 can locate the lines of code marked for modification by the element recognizer module 444 and make modifications to the code according to the result in the knowledge base 460 that is associated with the condition identified by the element recognizer module 444. For example, the rule modifier module 448 can select the modification associated with the browser identifier 468 associated with the copy 464 of the application 456 that has been processed by the code identification module 406. The formatter module 450 can format the code copy 464 according to the selected rule modification in the knowledge base 460 based on the assigned browser identifier 468. For example, a do-while loop element can be formatted as a for-each loop element based on the entry in the knowledge base. Once the code is formatted correctly with the modified element, the variables and other collected information 462 can be inserted into their appropriate locations in the lines of code. Note that the instructions marked for potential modification may already be formatted in an optimized fashion (e.g. originally developed in a format to reduce rendering time by a particular browser) for the particular browser identifier 468 and that marked element (i.e. marked instructions) may be skipped. The result of the code optimization module 408 can be a copy 464 of the application 456 with code modified based on the predetermined rules in the knowledge base 460 associated with the assigned browser identifier 468 for that copy 464.

In the above manner, a duplicate copy 464 of the application 456 can have a section of code modified while another copy 464 of the application 456 may n depending on the capabilities of the browser identifier 468 associated with that copy 464. The copies 464 of the application 456 can be maintained as the knowledge base 460 is updated and, thus, copies of the application 456 can be available upon receiving a request 466, such as a web request. Alternatively, a copy 464 can be created and modified upon receiving the request 466 (at the cost of the time to perform the identification and modifications). In the example of FIG. 4, a request 466 can be received and the browser identifier 468 of the request 466 can be determined by the browser identification module 404. For example, the browser identification module 404 can parse the headers of the request 468 to identify the browser engine to receive the response 470 to the request 466.

The code provision module 410 can prepare a response 470 including a copy 464 of the application 456 associated with the browser engine identified by the browser identification module 404. The code provision module 410 can include a selection module 454 that identifies code to provide based on the browser identifier 468. For example, the selection module 468 can receive the browser identifier 468 associated with the browser type, browser platform, and browser version identified by parsing the packet headers of the request 466 and select a script file assigned to that browser identifier 468. The compute device can then receive the response 470 and render the code of the response 470 to cause the application 456 to display to a user.

Figure 5:
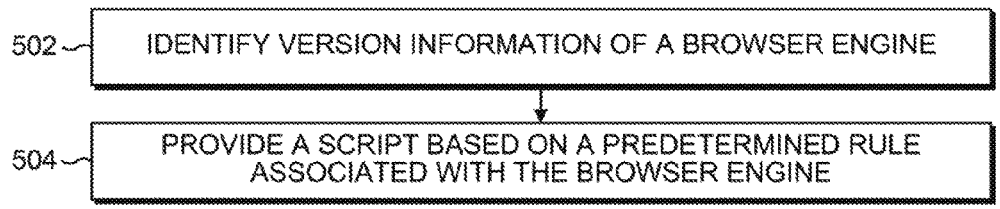
FIGS. 5 and 6 are flow diagrams depicting example methods for responding to a web request.
Figure 6:
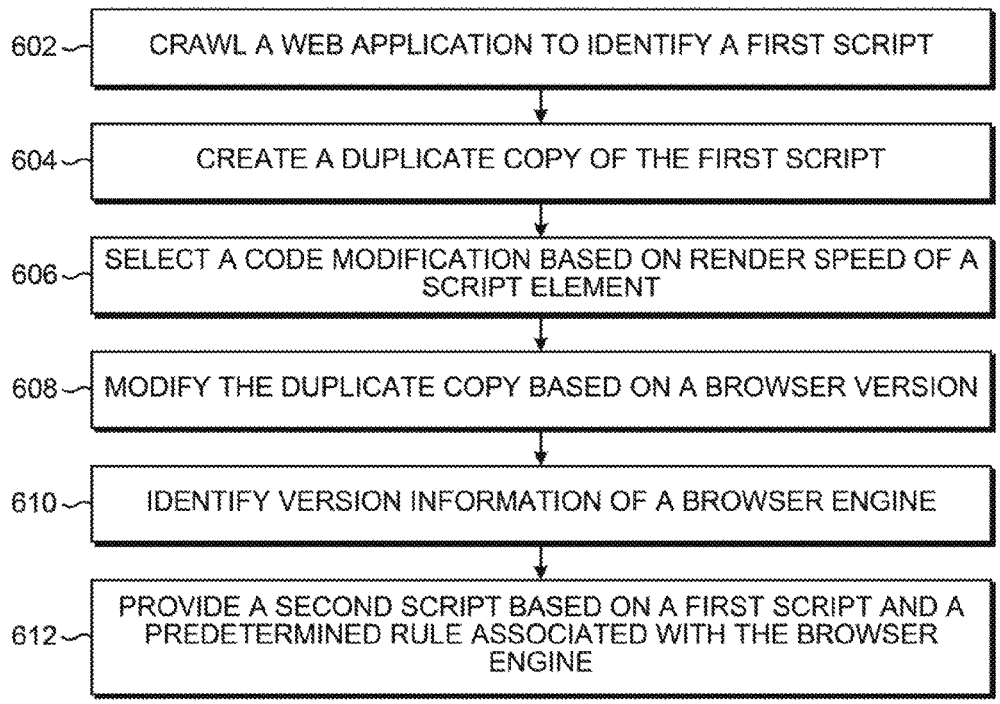

FIGS. 5 and 6 are flow diagrams depicting example methods for responding to a web request. Referring to FIG. 5, example methods for responding to a web request can generally comprise identifying version information of a browser engine and providing code, such as a script, based on a predetermined rule associated with the browser engine.

At block 502, version information of a browser engine can be identified based on the web request. For example, a browser identification engine 104 can utilize metadata of the request (e.g. information in a packet header of the request) to identify a browser to receive the response to the request (e.g. the browser that made the request), including, for example, the browser type, the browser platform, and the browser version. The version information can be associated with a browser identifier to identify the browser engine capabilities and the predetermined rules associated with the capabilities of the browser engine.

At block 504, a script can be provided in response to the request. For example, a code provision engine 110 can provide the script as a payload in packets sent in response to the web request. The script provided is based on a predetermined rule associated with the browser engine identified at block 502. The script can be modified upon request or premodified based on the possible requesting browsers and associated version information. The predetermined rule can be associated with the version information of the browser engine and the second script can be renderable by the browser engine to produce a second HTML code that is substantially similar to a first HTML code producible from a rendition by the browser engine based on the first script.

If the browser engine or version information is not associated with a predetermined rule, the original web application can be provided. For example, the second script provided by the code provision engine 110 can be the first script (e.g. original script) when the list of browser engines lacks the version information associated with the browser engine to receive the response to the web request.

FIG. 6 includes blocks similar to blocks of FIG. 5 and provides additional blocks and details. In particular, FIG. 6 depicts additional blocks and details generally regarding crawling a web application, creating a duplicate copy of the web application, selecting a code modification, and modifying the duplicate copy. Blocks 610 and 612 are the same as blocks 502 and 504 of FIG. 5 and, for brevity, their respective descriptions have not been repeated.

At block 602, a web application is crawled to identify a first script. The first script can be identified by matching an entry in the knowledge base of predetermined rules for script modifications. At block 604, a duplicate copy of the first script can be created. The duplicate copy can be made in preparation for optimizations to the code based on the predetermined rules. The duplicate copy can be made based on a list of browser versions in a knowledge base. At block 606, a code modification can be selected from the knowledge base based on the browser engine (i.e. version information of the browser engine). For example, the render speed (i.e. the speed at which the browser can render a set of instructions) of a second version of the basic core element can be greater than a first version of the basic core element in the original web application. For another example, the code modification can improve the render speed of the response in a comparison between a rendition of the script in the first form and a rendition of the script in the second form. At block 608, the duplicate copy can be modified based on the browser version identified at block 610. For example, the script element identified by crawling the application at block 602 can have a first form of a plurality of script element forms to produce an HTML code and the code modification to produce a second form of the plurality of script element forms can be selected based on rendering capabilities of the browser engine to receive the web request response. For another example, the predetermined rules can be used to associate the modifications for each modifiable lines of code and apply the code modification(s) identified at block 608 to optimize the render speed (i.e. modify the script to minimize the time to render the script elements by the browser engine) of the script for that browser version. For another example, the predefined rules of a data structure in the knowledge base can be used to find and replace code elements, lines of codes, and/or characters with more efficiently renderable JAVASCRIPT code associated with the replaceable code element, line of code, and/or character. The modified duplicate copy can be provided to the browser engine at block 612 when the version information is identified at block 610.

Although the flow diagrams of FIGS. 4-6 illustrate specific orders of execution, the order of execution may differ from that which is illustrated. For example, the order of execution of the blocks may be scrambled relative to the order shown. For a particular example, block 610 of FIG. 6 can be performed before blocks 602, 604, 606, and 608. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope the following claims.

What is claimed is:

1. A web request response system comprising:
    a processor resource; and
    a computer-readable memory resource on which is stored instructions that, when executed by the processor resource, cause the processor resource to:
        maintain a list of browser identifiers associated with a combination of a browser type, a browser version, and a browser platform in a knowledge base, the maintained list of browser identifiers being associated with a plurality of browser engines and a plurality of versions of an application to be rendered on the plurality of browser engines;
        identify a browser engine among the plurality of browser engines to receive a response of a web request;
        crawl a first code of the application to identify a section of code within the first code of the application to be modified based on a browser identifier for the identified browser engine among the maintained list of browser identifiers, the section of code being associated with an element within the first code of the application marked for modification and satisfying a predetermined rule in the knowledge base based on the browser identifier for the identified browser engine;
        create a copy of the first code based on an identification of the section of code within the first code to be modified, the copy of the first code being one of the plurality of versions of the applications;
        select a code modification among a plurality of code modifications based on the predetermined rule in the knowledge base associated with the browser identifier for the identified browser engine, the predetermined rule being related to a render speed of the first code by the browser engine; and
        based on the selected code modification, modify the section of code in the copy of the first code to produce a second code based on the render speed of the first code by the browser engine, wherein the first code is to be rendered by the browser engine at a first speed and the second code is to be rendered by the browser engine at a second speed different than the first speed.

2. The web request response system of claim 1, wherein the instructions cause the processor resource to provide the second code among the plurality of versions of the application in response to the 'web request, the second code to comprise a script that is renderable by the identified browser engine faster than a rendition of the first code by the identified browser engine.

3. The web request response system of claim 1, wherein the instructions cause the processor resource to maintain the plurality of versions of the first code, where each version of the plurality of versions of the first code is modified based on one among the maintained list of browser identifiers.

4. The web request response system of claim 1, wherein the instructions further cause the processor resource to:
    identify a condition of an entry in the knowledge base that matches the section of code within the first code, the section of code being located in a web application and the entry in the knowledge base comprising the condition and a format template; and
    produce the second code by replacing the section of code within the first code with the format template.

5. A computer-readable storage medium on which is stored computer-readable instructions that, when executed by a processor resource, cause the processor resource to:
    store an application code and a plurality of versions of the application code;
    maintain a list of browser identifiers associated with a combination of a browser type, a browser version, and a browser platform in a knowledge base of predetermined rules, the maintained list of browser identifiers being associated with a plurality of browser engines and the plurality of versions of the application code;
    crawl the application code to identify script code within the application code associated with an entry in the knowledge base of predetermined rules to modify the identified script code based on a browser identifier among the maintained list of browser identifiers, the identified script code being a section of the application code and associated with an element within the application code to be modified;
    create a duplicate copy of the application code, the duplicate copy of the application code being one of the plurality of versions of the application code;
    select a code modification among a plurality of code modifications based on a predetermined rule among the predetermined rules, the predetermined rule among the predetermined rules being associated with the browser identifier among the maintained list of browser identifiers and being related to a render speed of the identified script code by a browser engine among the plurality of browser engines correlated to the browser identifier;
    based on the selected code modification, modify the identified script code in the duplicate copy of the application code;
    maintain the plurality of versions of the application code including the duplicate copy of the application code based on the knowledge base of predetermined rules, wherein each of the plurality of versions of the application code are modified from the application code based on the predetermined rules according to respective browser identifiers; and
    provide, responsive to a web request that includes the browser identifier associated with the browser engine, the duplicate copy of the application code among the plurality of versions of the application code to the browser engine to render the duplicate copy of the application code on a computing device.

6. The medium of claim 5, wherein the computer-readable instructions further cause the processor resource to:
    assign each browser identifier of the maintained list of browser identifiers to the plurality of versions of the application code, each of the plurality of versions of the application code to include a code modification among the plurality of code modifications for the section of the application code; and modify the plurality of versions of the application code based on a plurality of entries in the knowledge base of predetermined rules associated with the browser identifier assigned to each of the plurality of versions of the application code, each entry of the plurality of entries including a second format template to replace code of a first format template.

7. The medium of claim 6, wherein the predetermined rule is storable in a predefined data structure including the browser identifier and a list of modification identifiers, each modification identifier associated with the code modification of the plurality of code modifications.

8. A method for responding to a web request from a browser engine comprising:

maintaining, by a processor resource, a list of browser identifiers associated with a combination of a browser type, a browser version, and a browser platform in a knowledge base, the list of browser identifiers being associated with a plurality of browser engines and a plurality of versions of a first script to be rendered on the plurality of browser engines;

storing, by the processor resource, the first script and the plurality of versions of the first script, where the plurality of versions of the first script includes a second script that is correlated to a browser identifier among the list of browser identifiers and optimized for render speed by one of the plurality of browser engines correlated to the browser identifier, wherein the second script is generated by:

crawling, by the processor resource, the first script to identify a script element of the first script to be modified based on the browser identifier among the list of browser identifiers, the script element being a portion of the first script that is marked for modification and satisfying a predetermined rule in the knowledge base based on the browser identifier;

creating, by the processor resource, a duplicate copy of the first script to generate the second script;

selecting, by the processor resource, a code modification for the portion of the first script that is marked for modification among a plurality of code modifications based on the predetermined rule in the knowledge base associated with the browser identifier, the predetermined rule being related to render speeds of the first script and the second script by the browser engine; and modifying, by the processor resource, the portion of the first script that is marked for modification in the second script based on the selected code modification;

based on the web request, identifying, by the processor resource, version information of the browser engine based on the browser identifier for the browser engine among the list of browser identifiers; and providing, by the processor resource, the second script responsive to the version information of the browser engine, the second script being renderable by the browser engine to produce a second hypertext markup language ("HTML") code that is the same as a first HTML code producible from a rendition by the browser engine based on the first script, the first HTML code to be rendered by the browser engine at a first speed and the second HTML code to be rendered by the browser engine at a second speed different than the first speed.

9. The method of claim 8, comprising:

creating the duplicate copy of the first script among the plurality of versions of the first script based on a list of browser versions in the knowledge base; and modifying each version among the plurality of versions of the first script based on an associated browser version.

10. The method of claim 8, wherein providing, responsive to the web request, the second script comprises providing the first script when a list of browser engines lacks the version information.

11. The method of claim 8, comprising:

crawling the first script to identify the script element having a first form of a plurality of script element forms to produce the first HTML code; and selecting the code modification to produce a second form of the plurality of script element forms.

12. The method of claim 11, wherein the code modification is one of a format modification, a data element modification, and a control element modification, and selecting the code modification is based on a render speed of the browser engine when the second form is rendered, the code modification to improve the render speed of a response in a comparison to the first script.

13. The medium of claim 5, wherein the identified script code is to be rendered by the browser engine at a first speed and the duplicate copy of the identified script code that contains the code modification is to be rendered by the browser engine at a second speed different than the first speed.

14. The web request response system of claim 1, wherein the instructions cause the processor resource to:

store a plurality of copies of the first code, where each copy of the plurality of copies of the first code is one of the plurality of versions of the application that is optimized for render speed by one of the plurality of browser engines.

15. The web request response system of claim 14, wherein the instructions cause the processor resource to:

crawl the application to identify, based on the predetermined rule related to the render speed of the first code by the one of the plurality of browser engines, an existence of a character, a structure, a control element, and/or a format of the first code.

16. The medium of claim 5, wherein the computer-readable instructions cause the processor resource to:

store the plurality of versions of the application code, where each copy of the plurality of copies of the application code is optimized for render speed by one of the plurality of browser engines.

17. The web request response system of claim 1, wherein the first code includes a second section of code of the application that is not modified, the second section of code being associated with a second element within the first code of the application that is different than the section of code associated with the element within the first code of the application.

18. The web request response system of claim 1, wherein the instructions further cause the processor resource to:

match lines of code in the first code with a first format template, the first format template to identify code elements, lines of codes, and/or characters to be modified in the section of code within the first code, wherein the first format template is correlated to the browser identifier and the predetermined rule in the knowledge base; and replace the matched lines of code in the copy of the first code based on a second format template, the second format template being correlated to the selected code modification among the plurality of code modifications.

19. The medium of claim 5, wherein the computer-readable instructions further cause the processor resource to:
match lines of code in the application code with a first format template, the first format template to identify code elements, lines of codes, and/or characters to be modified in the script code within the application code, wherein the first format template is correlated to the browser identifier and the predetermined rule among the predetermined rules in the knowledge base; and
replace the matched lines of code in the duplicate copy of the application code based on a second format template, the second format template being correlated to the selected code modification among the plurality of code modifications.

20. The method of claim 8, comprising:
matching lines of code in the first script with a first format template, the first format template to identify an element, lines of codes, and/or characters to be modified in the identified script element within the first script, wherein the first format template is correlated to the browser identifier and the predetermined rule in the knowledge base; and
replacing the matched lines of code in the second script based on a second format template, the second format template being correlated to the selected code modification among the plurality of code modifications.

* * * * *